US006574997B1

(12) United States Patent
Mayer et al.

(10) Patent No.: US 6,574,997 B1
(45) Date of Patent: Jun. 10, 2003

(54) COUPLING DEVICE FOR COUPLING A FRICTIONAL DAMPER TO A MACHINE FRAME OF A WASHING MACHINE

(75) Inventors: Dieter Mayer, Sulzbach-Rosenberg (DE); Helge Siegner, Altdorf (DE)

(73) Assignee: SUSPA Holding GmbH, Altdorf (DE)

( * ) Notice: Subject to any disclaimer, the term of this patent is extended or adjusted under 35 U.S.C. 154(b) by 0 days.

(21) Appl. No.: 09/959,772

(22) PCT Filed: Apr. 28, 2000

(86) PCT No.: PCT/EP00/03882

§ 371 (c)(1),
(2), (4) Date: Jan. 28, 2002

(87) PCT Pub. No.: WO00/68488

PCT Pub. Date: Nov. 16, 2000

(30) Foreign Application Priority Data

May 7, 1999 (DE) .......................... 199 21 152

(51) Int. Cl.[7] .............................................. D06F 37/22
(52) U.S. Cl. ..................... 68/23.1; 188/129; 248/638; 267/202; 267/203
(58) Field of Search .................. 68/23.1; 248/638; 188/129; 267/202, 203, 216

(56) References Cited

U.S. PATENT DOCUMENTS 3,509,742 A * 5/1970 Bauer .......................... 68/23.1
4,729,458 A * 3/1988 Bauer et al. .................. 188/129
4,991,412 A * 2/1991 Bauer et al. .................. 68/23.1
5,946,946 A * 9/1999 Sharp et al. .................. 68/23.1
6,151,930 A * 11/2000 Carlson .................... 68/23.1 X

FOREIGN PATENT DOCUMENTS

DE  3041878   *  6/1982
FR  1273419   *  9/1961   .................. 68/23.1

* cited by examiner

Primary Examiner—Philip R. Coe
(74) Attorney, Agent, or Firm—Browdy and Neimark, P.L.L.C.

(57) ABSTRACT

The invention relates to a coupling device (19) for coupling a frictional damper with a middle longitudinal axis (21), which is coupled to an oscillatory washing unit with a drum axis, to a machine frame of a washing machine with a spin gear. The coupling device has a first bending axis, which runs vertically to the central longitudinal axis (21) and parallel to the drum axis, a second bending axis (33) which runs vertically to the central longitudinal axis (21) and to the first bending axis and intersects both at one point, a first connecting element for connecting the coupling device (19) to the frictional damper, a second connecting element for connecting the coupling device (19) to the machine frame and a spring element (24) that is located between the first connecting element and the second connecting element and is connected to both, the flexural strength of the coupling device (19) about the second bending axis (33) being greater than the flexural strength about the first bending axis.

9 Claims, 3 Drawing Sheets

Figure 1:
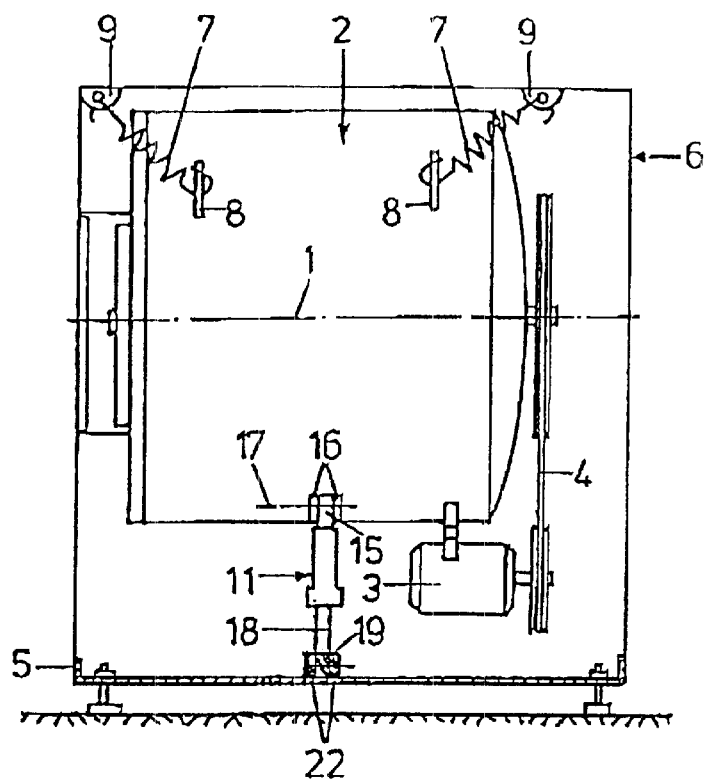

COUPLING DEVICE FOR COUPLING A FRICTIONAL DAMPER TO A MACHINE FRAME OF A WASHING MACHINE

REFERENCE TO RELATED APPLICATIONS

The present application is the national stage under 35 U.S.C. §371 of international application PCT/EP00/03882, filed Apr. 28, 2000, which designated the United States, and which application was not published in the English language.

The invention relates to a pivotable connection device for pivotable connection of a friction damper to a machine frame of a washing machine, with a spin cycle.

It is known, for instance from European Patent Disclosure EP 0 336 176 B1 (corresponding to U.S. Pat. No. 4,934,493), in washing machines with a spin cycle, to damp the washer assembly relative to the machine frame using friction dampers. The friction dampers are pivotably connected relative to the machine frame via pivotable connection devices. In the simplest case known by public prior use, the pivotable connection devices are embodied cylindrically of an elastic material and solidly connected on the one hand to the tappet of the friction damper and on the other to the machine frame of the washing machine. In spinning, oscillations of the washer assembly occur parallel to and perpendicular to the drum axis, along with tumbling motions of the washer assembly, leading to variously pronounced deflections of the pivotable connection point between the friction damper and the washer assembly parallel to the drum axis and perpendicular to it. A disadvantage of the known pivotable connection devices is that pivotable connection of the friction dampers to the machine frame cannot be done to suit the intensity of the individual components of the oscillations.

From U.S. Pat. No. 4,729,458, a friction damper for a washing machine is known. On its free ends, it has pivotable connection devices, which substantially comprise it rectangular rubber plate. The edges of the rectangle are of ditferent lengths, so that the damping about a first bending axis is different from the damping about a second bending axis that extends perpendicular to the first. A disadvantage here is that the ratio of the damping characteristics is adjustable only within a very narrow range, since because of the strength of the rubber and because of the space available for the pivotable connection device, very narrow conditions are necessarily set. Furthermore, the damping behavior of the pivotable connection device along the central longitudinal axis of the friction damper is essentially not adjustable.

From U.S. Pat. No. 3,509,742, a spring leg for a washing machine is known which is joined to the washer assembly and to the machine frame via two pivotable connection devices. The pivotabic connection device substantially comprises two rectangular rubber plates one above the other Once again, adjusting the ratio of the flexural strength about a first bending axis to the flexural strength about a bending axis extending perpendicular to it is quite limited. Furthermore, the damping behavior of the pivotable connection device along the central longitudinal axis of the spring leg is essentially hardly adjustable.

The object of the invention is to furnish a pivotable connection device for pivotable connection of a friction damper to the machine frame of a washing machine with a washer assembly, which enables a pivotable connection that corresponds to one of the individual components of tumbling motions of the washer assembly.

This object is attained by the characteristics of the body of claim 1. The nucleus of the invention is to furnish a pivolable connection device in which the flexural strength, that is, the contrary force occurring upon sagging, upon a deflection parallel to the drum axis of the washer assembly is greater than upon a deflection perpendicular to the drum axis.

Further advantageous features of the invention will become apparent from the dependent claims.

Figure 2:
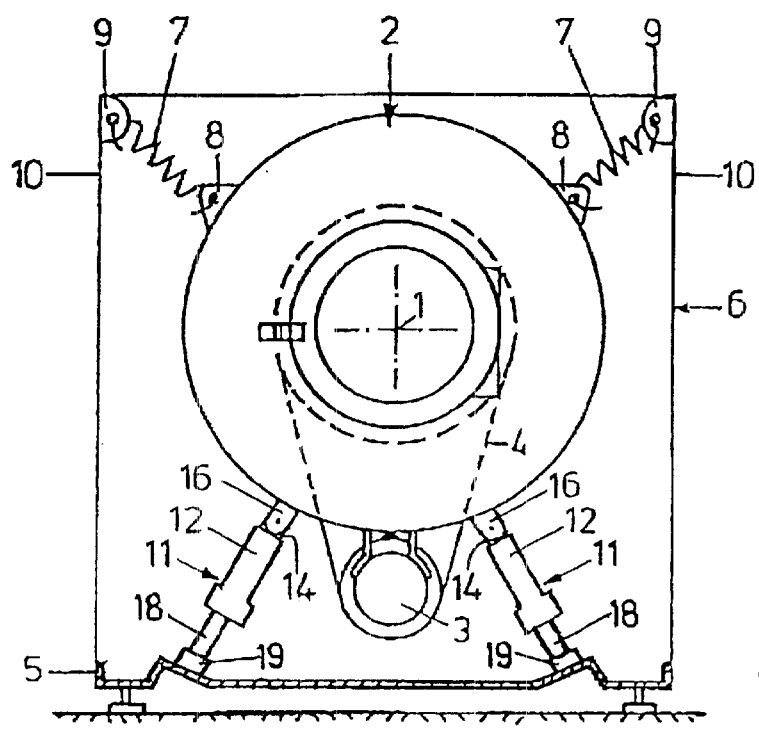
Figure 3:
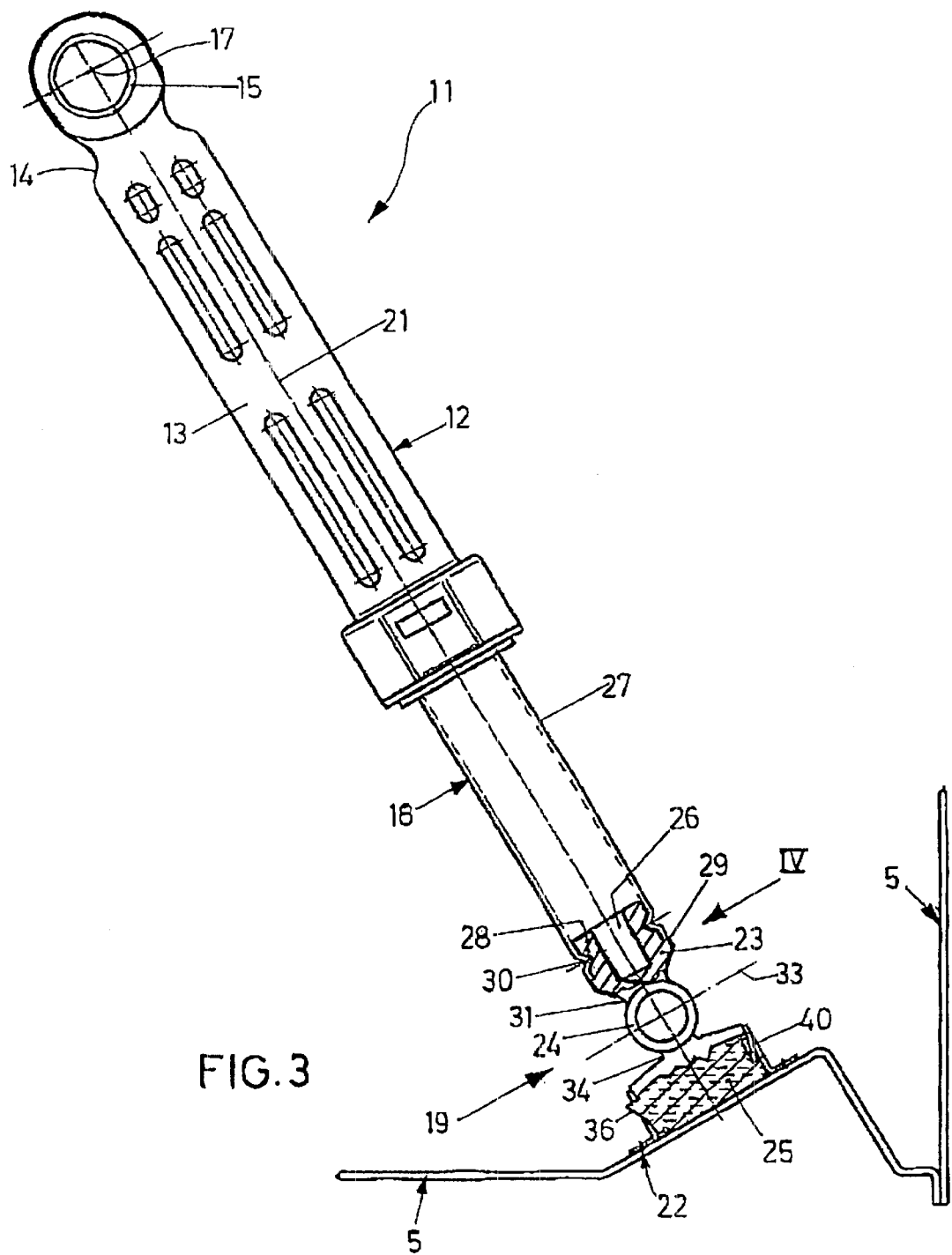
Figure 4:
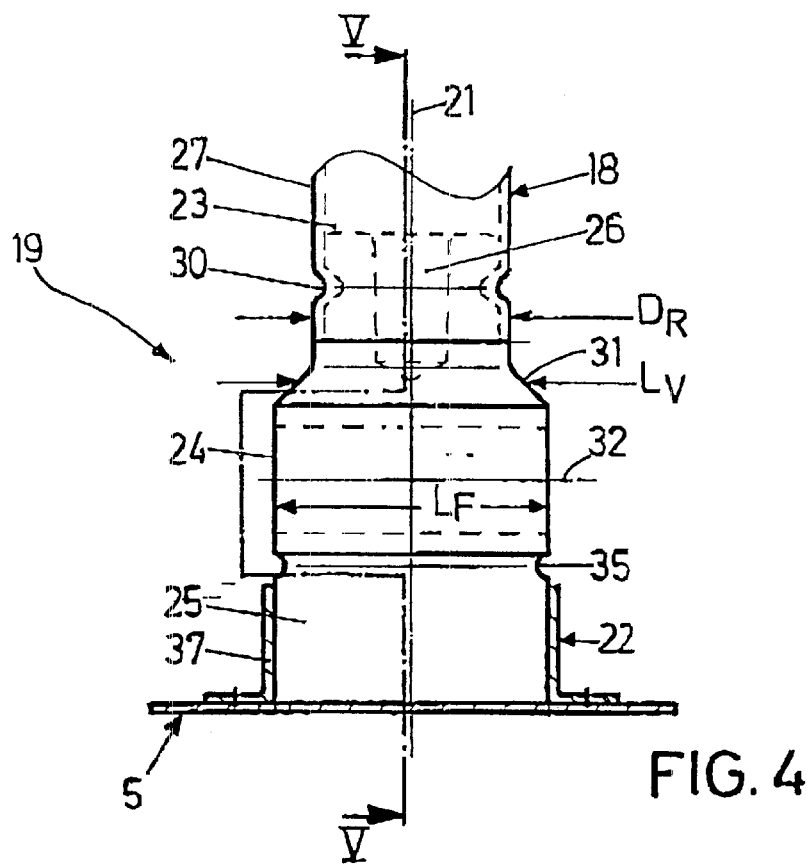
Figure 5:
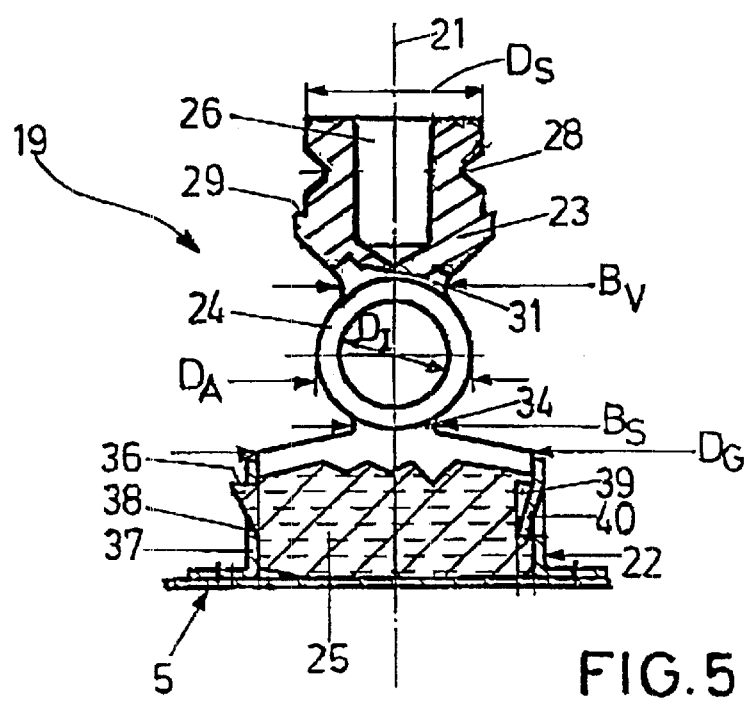

Additional characteristics and details of the invention will become apparent from the description in conjunction with the drawing, Shown are:

FIG. 1 a drum-type washing machine, in a schematic side view, with a friction damper and a pivotable connection device;

FIG. 2 a drum-type washing machine of FIG. 1 in a front view;

FIG. 3 an enlarged detail of the friction damper and the pivotable connection device in the view of FIG. 2;

FIG. 4 a view of the pivotable connection device in the direction of the arrow IV in FIG. 3; and FIG. 5 a cross-sectional view taken along the section line V—V in FIG. 4.

A drum-type washing machine with a horizontal drum axis has a vibratable washer assembly 2 with a drive motor 3, which, drives the washing drum, not shown in detail, via a belt drive 4. Other components, such as a gear, that are connected to the washer assembly 2 are not shown, for the sake of simplicity. The vibratable washer assembly 2 is suspended from a washing machine housing 6, braced on a machine frame 5 formed by a base frame, by means of helical tension springs 7. The tension springs are attached on the one hand to eyelets, mounted in the upper region of the washer assembly 2. On the other, they are suspended from eyelets 9 that are embodied on side walls 10 of the housing 6. Instead of this kind of suspension of the washer assembly 2 from tension springs 7, bracing the washer assembly 2 in a known manner via so-called spring legs on the machine frame 5 can also be provided, as known from European Patent Disclosure EP 0 108 217 B1 (corresponding to U.S. Pat. No. 4,991,412). What is decisive is that the washer assembly 2 be suspended or braced in a way that leaves it free to vibrate.

Between the washer assembly 2 and the machine frame 5, friction dampers 11 are also provided, which are known for 20. instance from EP 0 336 176 B1 (corresponding to U.S. Pat. No. 4,934,493). Each friction damper 11 has a housing 12. The housing 12 substantially comprises a cylindrical tube 13, which is closed on one end by a bottom 14. An articulated bush 15 in the form of a pivotable connection element is mounted on the outside of the bottom 14, and by means of it the friction damper 11 is mounted on a bearing 16 on the washer assembly 2 in such a way that the friction damper 11 is mounted so that it is pivotable about a pivot axis 17 relative to the washer assembly 2, which pivot axis extends parallel to the drum axis 1. The applicable friction damper 11 also has a tappet 18, which on its outer end has an elastic pivotable connection device 19. The friction damper 11 and the pivotable connection device 19 have a common central longitudinal axis 21. Via the pivotable connection device 19, the friction damper 11 is joined to a connecting base 22 that is mounted on the machine frame 5. In succession along the central longitudinal axis 21, the pivotable connection device 19 has a tappet connection stopper 23 embodied as a first connection element, a tubular spring element 24, and a frame connection stopper 25 embodied as a second connection element, all three of which are embodied in one piece. The stopper 23 is embodied essentially circular-cylindrically with a diameter $D_S$ and concentrically to the axis 21, and on its free end it has a blind bore 26 to increase the deformability of the stopper 23 radially to the axis 21. For joining the stopper 23 to the tappet 18, the latter substantially comprising a thin-walled metal tube 27, the stopper 23 has an annular groove 28 as well as a stop edge 29 that is downstream in the direction of the spring element 24. The tube 27 is located on one end in contact with the stop edge 29 and is secured to the stopper 23 by a bead 30 embodied in the tube 27 and extending radially to the axis 21. The spring element 24 is joined to the stopper 23 via a connecting rib 31. The spring element 24 is embodied annularly cylindrically and concentrically to a first bending axis 32, which intersects the axis 21 perpendicular to it and extends parallel to the drum axis 1. An axis extending perpendicular to the axes 21 and 32 and intersecting both of them at one point is called a second bending axis 33. It is also possible to provide spring elements 24 with an elliptical or rectangular cross-sectional profile or some arbitrary other profile. The length LF of the spring element 24 parallel to the axis 32 is greater than the outside diameter $D_A$ of the spring element 24 parallel to the bending axis 33. The applicable relationships are: $L_F/D_A \geq 1.5$, and in particular $L_F/D_A > 2$. For the ratio of the outside diameter $D_A$ to the inside diameter of the spring element 24, the following is true: $D_A/D_I \approx 1.4$. For the width $B_V$ of the connecting rib 31 parallel to the bending axis 33, it is true that $B_V \leq D_A$, $B_V \leq D_S$, and in particular $B_V \leq D_I$. The length $L_V$ of the connecting rib 31 parallel to the bending axis 32 decreases steadily from the length $L_F$ of the spring element 24 to the outside diameter $D_R$ of the tube 27. On the side of the spring element 24 opposite the connecting rib 31, a connecting rib 34 is provided, by way of which the stopper 25 is joined to the spring element 24. For the width $B_S$ of the connecting rib 34 parallel to the bending axis 33, the following is true: $B_S \approx B_V$, and in particular $B_S \leq B_V$. On the ends pointing in the direction of the bending axis 32, the connecting rib 34 has longitudinal grooves 35. The stopper 25 is embodied essentially annularly cylindrically and concentrically to the axis 21 and has a diameter $D_G$ of which it is true that $B_S \leq D_G$. In a first embodiment, shown in the left-hand half of FIG. 5, it has circumferentially disposed, radially outward-protruding detent lugs 36, which narrow toward the free end of the stopper 25. The connecting base 22 has an annular-cylindrical wall 37 with detent openings 38, which are engaged by the detent lugs 36 and lock the pivotable connection device 19 against tension relative to the machine frame 5. In a second embodiment, shown in the right-hand half of FIG. 5, the stopper 25 has an annular groove 39 on its circumference. Instead of the annular groove 39, individually recesses could also be provided. Individual locking arms 40, which lock the pivotable connection device 19 against tension relative to the machine frame 5, are joined integrally to the wall 37 and engage the annular groove 39. The pivotable connection device 19 is fabricated from a thermoplastic polyelastomer or a thermoplastic polyurethane. Other flexible materials can also be used. In particular, it is also possible for only the spring element 24 to comprise an elastic material. Instead of the articulated bush 15, it is also possible to provide a pivotable connection device 19 which in that case is joined on the one hand to the housing 12 and on the other to the washer assembly 2. It is possible to provide a pivotable connection device 19 according to the invention in which the variables $D_S$, $D_R$, $B_V$, $D_A$, $D_I$, $B_S$, $D_G$, $L_F$, $L_V$ deviate from the proportions given above.

The mode of operation of the pivotable connection device 19 will now be described. In operation of the washer assembly 22 in the spin cycle, not only vibrations perpendicular to the drum axis 1 but also parallel to it occur, namely pitching vibrations, and corresponding superpositions of both types, or in other words tumbling motions. For the most part, these motions are damped by the friction dampers 11. Because of the vibrations of the washer assembly 2, the articulated bush 15 is displaced, and hence a bending moment acts on the pivotable connection device 19. Because of the above-described design of the pivotable connection device 19, it has a flexural strength about the bending axis 32 that is less than the flexural strength about the bending axis 33. This is dictated by the tubular structure of the spring element 24, and the ratio of the two flexural strengths can be adjusted freely by varying the dimensions. The flexural strength about the bending axis 32 relative to the flexural strength about the bending axis 33 is reduced by the provision of connecting ribs 31 and 34 that are narrow relative to the outside diameter $D_A$. This means that vibrations parallel to the drum axis 1 will be damped more markedly than vibrations perpendicular to the drum axis 1. Remaining vibrations that are not damped by the friction damper 11, and in particular vibrations parallel to the axis 21, are damped by a deformation of the spring element 24. It is thus possible by means of the pivotable connection device 19 for a friction damper 11, deflected in various directions with variously strong force, to be pivotably connected to the machine frame 5 in a manner appropriate for the magnitude of the forces.

What is claimed is:

1. A pivotable connection device (19) for pivotable connection of a friction damper (11), which has a central longitudinal axis (21) and is pivotably connected on a washer assembly (2) that has a drum axis (1) and is supported in a manner capable of vibration, to a machine frame (5) of a washing machine (2) with a spin cycle, having a) a first bending axis (32), which extends perpendicular to the central longitudinal axis (21) and parallel to the drum axis (1);

b) a second bending axis (33), which extends perpendicular to the central longitudinal axis (21) and to the first bending axis (32) and intersects them both at one point;

c) a first connection element for connecting the pivotable connection device (19) to the friction damper (11);

d) a second connection element for connecting the pivotable connection device (19) to the machine frame (5); and e) a spring element (24), disposed between the first connection element and the second connection element and connected to both of them;

f) wherein the flexural strength of the pivotable connection device (19) about the second bending axis (33) is greater than the flexural strength about the first bending axis (32), characterized in that g) the spring element (24) is embodied in tubular form.

2. The pivotable connection device (19) of claim 1, characterized in that the spring element (24) is embodied concentrically to the first bending axis (32).

3. The pivotable connection device (19) of claim 1, characterized in that the spring element (24) is connected to the first connection element via a first connecting rib (31).

4. The pivotable connection device (19) of claim 3, characterized in that the width $B_V$ of the first connecting rib (31), referred to the second bending axis (33), is less than the diameter $D_S$ of the first connection element.

5. The pivotable connection device (19) claim 1, characterized in that the spring element (24) is connected to the second connection element via a second connecting rib (32).

6. The pivotable connection device (19) of claim 5, characterized in that the width $B_S$ of the second connecting rib (34), referred to the second bending axis (33), is less than the diameter $D_G$ of the second connection element.

7. The pivotable connection device (19) of claim 1, characterized in that the outside diameter $D_A$ of the spring element (24) perpendicular to the first bending axis (32) is less than the length $L_F$ of the spring element (24) parallel to the first bending axis (32).

8. The pivotable connection device (19) of claim 1, characterized in that the first connection element and the spring element (24) and second connection element are embodied in one piece.

9. The pivotable connection device (19) of claim 1, characterized in that the spring element (24) is formed of thermoplastic elastomers or thermoplastic polyurethanes.

* * * * *